United States Patent
Jerg et al.

(10) Patent No.: US 10,405,728 B2
(45) Date of Patent: Sep. 10, 2019

(54) DISHWASHER COMPRISING A RESERVOIR AND ASSOCIATED PREHEATING METHOD

(75) Inventors: Helmut Jerg, Giengen (DE); Michael Georg Rosenbauer, Reimlingen (DE); Franz-Josef Wagner, Nördlingen (DE)

(73) Assignee: BSH Hausgeräte GmbH, Munich (DE)

( * ) Notice: Subject to any disclaimer, the term of this patent is extended or adjusted under 35 U.S.C. 154(b) by 1599 days.

(21) Appl. No.: 13/390,948

(22) PCT Filed: Aug. 23, 2010

(86) PCT No.: PCT/EP2010/062244
§ 371 (c)(1),
(2), (4) Date: Feb. 17, 2012

(87) PCT Pub. No.: WO2011/026756
PCT Pub. Date: Mar. 10, 2011

(65) Prior Publication Data
US 2012/0145194 A1   Jun. 14, 2012

(30) Foreign Application Priority Data
Sep. 3, 2009  (DE) .......................... 10 2009 029 185

(51) Int. Cl.
*A47L 15/42* (2006.01)
*A47L 15/00* (2006.01)

(52) U.S. Cl.
CPC ....... *A47L 15/4285* (2013.01); *A47L 15/0015* (2013.01); *A47L 15/0047* (2013.01);
(Continued)

(58) Field of Classification Search
CPC ............. A47L 15/0015; A47L 15/0047; A47L 15/4221; A47L 15/4225; A47L 15/4255;
(Continued)

(56) References Cited

U.S. PATENT DOCUMENTS 5,241,975 A * 9/1993 Yanagihara ............. A47L 15/18
                                                       134/176
5,264,043 A * 11/1993 Milocco ....................... 134/25.2
(Continued)

FOREIGN PATENT DOCUMENTS

DE    3021746 A1 * 12/1981 ......... A47L 15/0047
DE    3900617 A1    7/1990
(Continued)

OTHER PUBLICATIONS

Machine translation of DE3021746A1 dated Dec. 1981.*
Machine translation of JP11-267085A dated Oct. 1999.*
International Search Report PCT/EP2010/062244.

*Primary Examiner* — Douglas Lee
(74) *Attorney, Agent, or Firm* — Michael E. Tschupp; Andre Pallapies; Brandon G. Braun

(57) ABSTRACT

A dishwasher includes a reservoir for storing washing fluid, and a control device configured for calling up at least one dishwashing program for controlling a washing cycle for washing items to be washed in a washing chamber and at least one preheating program for controlling a preheating cycle for preheating washing fluid for a washing cycle separately from each other. The preheating cycle includes a heating phase during which washing fluid is circulated and the circulated washing fluid is heated. The preheating cycle has downstream of the heating phase a pumping phase during which previously circulated and heated washing fluid is pumped into the reservoir.

18 Claims, 2 Drawing Sheets

(52) U.S. Cl.
CPC ....... *A47L 15/4225* (2013.01); *A47L 15/4291* (2013.01); *A47L 15/4209* (2016.11); *A47L 15/4221* (2013.01); *A47L 2501/03* (2013.01); *A47L 2501/05* (2013.01); *A47L 2501/26* (2013.01); *A47L 2601/02* (2013.01); *Y02B 40/42* (2013.01); *Y02B 40/44* (2013.01)

(58) Field of Classification Search
CPC ............ A47L 15/4285; A47L 15/4291; A47L 2501/03; A47L 2501/05; A47L 2501/26; A47L 2601/02; Y02B 40/42; Y02B 40/44
See application file for complete search history.

(56) References Cited

U.S. PATENT DOCUMENTS

| | | | | |
|---|---|---|---|---|
| 2004/0149321 A1* | 8/2004 | McKee | ............... | A47L 15/0002 134/56 D |
| 2008/0283099 A1* | 11/2008 | Peukert et al. | .............. | 134/99.1 |
| 2011/0155179 A1* | 6/2011 | Delle | .................. | A47L 15/4291 134/25.2 |

FOREIGN PATENT DOCUMENTS

| | | | | |
|---|---|---|---|---|
| DE | 3901169 A1 | 7/1990 | | |
| DE | 102007041308 A1 * | 3/2009 | ......... | A47L 15/4291 |
| EP | 0911438 A1 | 4/1999 | | |
| EP | 1004266 A1 * | 5/2000 | ......... | A47L 15/4219 |
| EP | 1055389 B1 | 12/2003 | | |
| GB | 2164546 A * | 3/1986 | | |
| JP | 11267085 A * | 10/1999 | | |

\* cited by examiner

DISHWASHER COMPRISING A RESERVOIR AND ASSOCIATED PREHEATING METHOD

BACKGROUND OF THE INVENTION

The present invention relates to a dishwasher, in particular a domestic dishwasher, having a control device, in the case of which at least one dishwashing program for controlling a washing cycle for washing items to be washed in a washing chamber and at least one preheating program for controlling a preheating cycle for preheating washing fluids for a washing cycle can be called up separately from each other, with the preheating cycle comprising a heating phase during which washing fluid is circulated and the circulated washing fluid heated.

What is known from practice is a dishwasher that offers the option of running a preheating cycle for preheating a washing fluid before a washing cycle for washing items to be washed is run, during which said items are treated with washing fluid in a washing chamber. That operating function is referred to as a "wait & run" function. A preheated washing fluid will be available at the start of the washing cycle when that option is chosen so that at least one heating phase can be shortened or even omitted during the washing cycle. The length of time needed for a washing cycle can be shortened thereby.

What is disadvantageous though in the known dishwasher is the sharp increase in electric energy consumed by the dishwasher when running the preheating option.

BRIEF SUMMARY OF THE INVENTION

The object of the present invention is to provide a dishwasher offering a preheating option in which energy efficiency is improved.

Said object is achieved in a dishwasher of the kind cited in the introduction through the preheating cycle's including downstream of the heating phase a pumping phase during which previously circulated and heated washing fluid is pumped into a reservoir for storing washing fluid.

The inventive dishwasher's, in particular domestic dishwasher's energy efficiency can be improved thereby. In particular the dishwasher's running time for executing a selected dishwashing program's washing cycle can be shortened by prewarming the washing fluid and intermediately storing said prewarmed washing fluid in a, particularly additional, reservoir before the selected dishwashing program is started.

The inventive dishwasher has a control device for automatically controlling operational sequences of the dishwasher. The control device can for that purpose be embodied as what is termed a sequence controller, in particular an electronic sequence controller.

Stored on the control device is at least one dishwashing program for controlling a washing cycle for washing items to be washed, in particular for washing crockery. A plurality of washing programs are therein advantageously provided of which in each case one can be selected and started by the user. It will be possible thereby to match a washing-cycle run in particular to, for example, the amount of items loaded, the type of items loaded, how dirty they are, and/or to the desired length of the washing cycle.

The respectively stored washing programs can preferably each include at least one prewashing step for precleaning items to be washed, at least one cleaning step for thoroughly cleaning items to be washed, at least one intermediate washing step for removing dirty washing fluid from the washed items, at least one rinsing step for preventing stains on the washed items and/or in preparation for a drying step, and/or at least one drying step for drying the washed items. One or more partial steps such as, for instance, the prewashing step or intermediate washing step can possibly also be omitted.

Moreover at least one preheating program for controlling a preheating cycle for preheating washing fluid for a washing cycle is stored in the control device. A plurality of preheating programs can therein be provided in the case of which for example washing fluid is preheated to respectively different temperatures.

What is understood by a washing fluid is therein in particular a liquid which is provided for being applied to the items to be washed in order to clean and/or otherwise treat them. Thus the washing fluid can be provided also for, for example, warming the items to be washed, which is usual during, for instance, a rinsing step. A washing fluid ordinarily consists for the most part of water. The washing fluid can therein be supplemented, depending on the dishwasher's specific operating phase, with cleaning agents, auxiliary cleaning agents such as, for example, rinsing agent, other additives, and/or dirt that has been detached from the items being washed.

An assigned partial washing cycle of a washing cycle is put into effect by a selected dishwashing program's respective washing step. The respective washing cycle therein includes in particular one or more liquid-bearing partial washing cycles as well as a drying cycle that concludes the washing cycle and during which expediently no washing fluid is circulated.

The preheating program(s) is/are embodied such that the preheating cycle includes a heating phase during which washing fluid is circulated and the circulated washing fluid heated. Simultaneously circulating and heating the washing fluid will enable a larger amount of washing fluid to be evenly heated in a relatively short time. For circulating the washing fluid during the preheating cycle in particular a pump belonging to the dishwasher can be used that is employed during a washing cycle for circulating washing fluid in order by means of a spraying device to apply washing fluid to items to be washed, in particular to spray them. For heating the circulated washing fluid during the preheating cycle it is possible furthermore to use a heating device that is employed primarily for heating washing fluid during a washing cycle of a selected dishwashing program. Both measures will enable the inventive dishwasher's structural design to be kept simple. The components of the dishwasher's existing liquid-circulating system will advantageously suffice for preheating the washing fluid.

The preheating program and dishwashing program can in the inventively embodied dishwasher be started mutually independently by a person operating it. The person operating the dishwasher or its control device will hence have the possibility initially to start the preheating program at the end of which in a pumping phase the reservoir will be filled with preheated washing fluid. The dishwasher will thereby be operationally ready at the start of the washing cycle of a dishwashing program requiring to be selected, or, as the case may be, will be available in a prepared state having a ready, preheated or, as the case may be, prewarmed partial amount of washing-bath liquid or amount of washing-bath liquid and be awaiting activating or, as the case may be, starting of the desired dishwashing program. Said activating can be performed by, for example, the dishwasher's user or automatically by its control device. Thus the person operating the dishwasher will after its cited preparation have the possibility of initiating a dishwashing program at any later time after completion of the preheating program. The items to be washed can be loaded into the dishwasher's washing chamber while the dishwasher is in this "waiting condition", which is to say only when the preheating program has finished. Thus between the end of the preheating cycle and the time when the respective dishwashing program starts, a waiting time or, as the case may be, pause will be available during which the washing chamber of the dishwasher's washing container can be loaded with items that are to be washed and cleaned. The washing fluid in the preheating cycle can in particular be circulated in such a way that the one or more crockery baskets, the side walls, the upper wall of the washing container, and/or one or more possibly present upper spraying elements will remain largely dry, which is to say largely unsprayed by washing fluid. The washing space of the dishwasher's washing container will hence remain substantially dry during the preheating cycle and during the waiting condition thereafter. The length of time for which the items being washed will not be available for their intended use can therefore be shortened in conjunction with the shortening of the dishwashing program's running time because of the preheated washing fluid. The dishwasher's being at least partially loaded before the preheating program is run is of course not precluded here. Readying the dishwasher with a prewarmed washing-bath liquid in the reservoir and the dishwasher's ensuing waiting in this state of readiness is referred to as "wait & run" and the subsequent starting of the desired dishwashing program as "run".

It is possible, though, also to call up a dishwashing program when a preheating program has not been run. That will, however, lengthen the dishwashing program's running time if it is desired to achieve a comparable cleaning and/or drying effect. There will be some saving in electric energy if said lengthening is acceptable, though.

It is particularly provided in the inventive dishwasher for the preheating cycle to include a pumping phase that is downstream of the heating phase and during which previously circulated and heated washing fluid is pumped into a reservoir for storing washing fluid. Moving the previously circulated and heated washing fluid to a suitable reservoir, referred to in particular below as a fluid store, will make it possible to reduce heat losses and hence energy losses especially between the preheating cycle and ensuing washing cycle.

Compared with solutions where the heated water is stored in the washing chamber of the dishwasher's washing container on completion of the preheating cycle, both heat losses due to thermal conduction and heat losses due to the evaporation of washing fluid can be reduced in the inventively embodied dishwasher. That is because the preheated washing fluid would be distributed in a lower region of the washing chamber were it to be stored only in said chamber of the dishwasher's washing container, and the result of that would be that it would come into wide-area thermal contact with the floor and/or a collecting pot of the washing chamber. Heat would thereby be ducted away to the outside via the floor or, as the case may be, collecting pot. A considerable portion of the washing fluid in the washing chamber could also evaporate owing to the washing chamber's relatively large volume so that the remaining washing fluid would undergo further cooling. Those disadvantages can be avoided in the inventive dishwasher through the use of a suitably sized reservoir. Energy losses between the completion of the preheating cycle and the start of the washing cycle can overall be reduced in that way. Energy use for reheating the stored washing fluid during the washing cycle can be reduced thereby, which will enhance the inventive dishwasher's energy efficiency. The advantage will therein be all the greater the longer this intermediate phase lasts depending on how the person operating the dishwasher acts.

Since, moreover, the temperature of the stored washing fluid is higher particularly at the start of the dishwashing program, an intensive thermal effect can already be achieved with the washing fluid advantageously when the items to be washed start being treated, which will be noticeable for example during a cleaning cycle of the washing cycle through a greater cleaning power, which can in turn allow the cleaning cycle to be shortened with a comparable cleaning effect being achieved.

The items being washed can furthermore be warmed more quickly particularly during a rinsing cycle by means of the washing fluid that is intermediately stored in the reservoir and was prewarmed during the upstream preheating cycle so that the items being washed can reach the temperature necessary for an ensuing drying cycle more quickly. The length of the washing cycle can advantageously overall be further shortened thereby.

Through storing the preheated washing fluid in a reservoir it will moreover in many cases be possible to prevent a substantial amount of water vapor escaping from the dishwasher while the washing chamber is being loaded after a preheating cycle. In particular an addition of moisture to the ambient air can be reduced thereby. An undesired impacting of water vapor on the person operating the dishwasher while loading its washing chamber can moreover be avoided. Operating convenience can be enhanced thereby.

According to an expedient development of the invention it can in particular be provided for washing fluid to have been heated by a heating device during the preheating cycle's heating phase. Said device can be embodied particularly as a continuous-flow heater. A continuous-flow heater includes a water-ducting element, for example a pipe, on or in which at least one heating element is located. A continuous-flow heater is therein characterized by a small structural size, high efficiency, and even heating of the circulated washing fluid. The continuous-flow heater can expediently have been integrated in the pump that is used during the heating phase for circulating the washing fluid.

According to an advantageous development of the invention it can in particular be provided for washing fluid to have been circulated by a circulating pump during the preheating cycle's heating phase, which pump is connected on the input side to a collecting pot belonging to the washing chamber. A circulating pump of such kind is ordinarily present in modern dishwashers for circulating washing fluid during a washing cycle in order thereby to apply washing fluid to the items being washed. Using a pump of such kind means that a separate pump will not be required for performing the heating phase. The inventive dishwasher's structural design will be simplified thereby.

According to a preferred development of the invention it can be expediently provided for washing fluid to have been fed back during the preheating cycle's heating phase into the washing chamber's collecting pot via a spraying device located in the washing chamber, which device can be connected to the output side of the circulating pump and is provided for spraying items to be washed with washing fluid during a washing cycle. A spraying device of such kind is present in any event in virtually all modern dishwashers. A closed circulating circuit can be realized thereby without the structural design of known dishwashers having to be substantially modified.

According to an advantageous development of the invention, the spraying device has a plurality of spraying elements that can be individually connected to the circulating pump via a water divider, with the water divider having been controlled such that washing fluid will have been fed back into the collecting pot during the heating phase substantially via a spraying element located in a lower region of the washing chamber. Spraying devices in modern dishwashers ordinarily have a plurality of spraying elements that can be individually connected to the circulating pump, with it being possible for the spraying elements to be embodied as fixed or moveable. Moreover a water divider is usually also provided which can be controlled by the control device in such a way that the spraying elements can be loaded with washing fluid individually, in groups, or all together.

If the water divider has been controlled such that washing fluid will be fed back into the collecting pot during the preheating cycle's heating phase substantially via a spraying element located in a lower region of the washing chamber or via a plurality of spraying elements located in a lower region of the washing chamber, then the washing fluid will be circulated in a relatively short circulating circuit. A transfer of heat from the washing fluid to water-bearing parts in the circulating circuit during the heating phase can be minimized thereby. The inventive dishwasher's energy efficiency can be further improved thereby. Contact during the heating phase between the washing fluid and possibly already loaded items to be washed can moreover be reduced or completely avoided. The items to be washed can in that way be prevented from taking an impermissible amount of heat from the circulated washing fluid in the preheating cycle.

According to an advantageous development of the invention it can in particular be provided for a speed of the circulating pump to have been controlled such as to be in particular slower during the preheating cycle's heating phase than its nominal speed while a partial washing cycle, in particular cleaning cycle, of the respectively selected dishwashing program's washing cycle is running. There will in that way be a slower circulating speed during the preheating cycle's heating phase than for example during a cleaning cycle of a washing cycle. The washing fluid will thereby in particular exit the spraying device's spraying elements at a slower speed during the preheating cycle. The washing fluid sprayed into the washing chamber will in that way be less distributed in the washing chamber and so will transfer less heat thereto. The electric energy consumed during the preheating cycle can be further reduced thereby.

According to a particularly preferred development of the invention, the circulating pump's speed can in particular have been controlled such that washing fluid exiting a spraying element located underneath a crockery basket during the preheating cycle's heating phase will for the most part not reach the crockery basket and/or the items to be washed that are located therein, meaning they will remain largely unsprayed and hence dry. Modern dishwashers ordinarily have one or more crockery baskets for positioning items to be washed. A rotatably mounted spraying arm having on its top side outlet nozzles for washing fluid is therein in most cases located beneath each crockery basket present. The circulating pump therein operates at such a fast speed at least at times while a washing cycle is running that the speed of the washing fluid exiting through the nozzles will be so fast that the washing fluid will reach the items to be washed located in the crockery basket in order, for example, to clean them. What can be achieved in particular by reducing the circulating pump's speed during the preheating cycle's heating phase is that the washing fluid will exit the nozzles so slowly that the washing fluid will largely have been prevented from coming into contact with either the crockery basket or the items to be washed that are located therein. Heating of the crockery basket or, as the case may be, the items to be washed will largely be avoided thereby, which will at the same time prevent the washing fluid from cooling to an impermissible extent. The energy consumption during the preheating cycle's heating phase can be further minimized in that way.

According to an expedient development of the invention, the circulating pump can in particular include a brushless electric motor, preferably a brushless direct-current motor. The brushless electric motor can be embodied particularly as a permanent-magnet motor. A brushless permanent-magnet motor of such kind can be embodied as a brushless direct-current motor, referred to also as a BLDC motor, as a brushless alternating-current motor, referred to also as a BLAC motor, or as a synchronous motor. The motor's rotor therein includes at least one permanent magnet, whereas the stator has a plurality of electromagnets. The electromagnets are therein commutated via electronic-control means. Compared with other possible motor designs, both the motor's direction of rotation and its speed can be controlled or regulated thereby in a simple manner. By operating the motor in precisely one direction of rotation it is possible to optimize the water-bearing parts of the circulating pump in terms of flow. The result is a high pumping capacity coupled with low energy use. The pumping capacity of the circulating pump can moreover also be controlled or regulated as required, which will increase the energy efficiency still further. The brushless permanent-magnet motor can furthermore be embodied as a wet-rotor motor so that complex sealing measures will be obviated.

According to an advantageous development of the invention, washing fluid can be pumped into the reservoir by the circulating pump via the water divider or a valve during the preheating cycle's pumping phase. It will thereby be possible to dispense with a separate pump for the preheating cycle's pumping phase, which will keep the inventive dishwasher's structure simple.

In an advantageous exemplary embodiment, the water divider can in particular be embodied such as to have an output that is connected to the reservoir. It can therein be advantageous for the water divider to be expediently embodied such that it can be controlled during the preheating cycle's pumping phase such that the output leading to the reservoir is open and the other outputs, which are usually connected to spraying elements of the spraying device, are closed.

In another advantageous exemplary embodiment it is possible to use a conventional water divider, the outputs of which are connected only to the spraying device's spraying elements. Preferably an additional valve, the input of which can have been connected to the water divider's input will then control the inflow to the reservoir. The water divider can therein in particular have been controlled such that all its outputs are closed so that the washing fluid conveyed by the circulating pump will no longer be circulated but will instead be pumped completely in the direction of the reservoir.

According to an advantageous development of the invention, the pump's speed can have been increased during the preheating cycle's pumping phase compared with the preheating cycle's heating phase. The washing fluid can thereby be transported into the reservoir particularly quickly so that heat losses during the pumping phase can be reduced.

According to an expedient development of the invention, an output of a message signaling the end of the preheating cycle signal to the user can be provided after the end of the pumping phase. The person operating the dishwasher will thereby be put in the position of being able to use the dishwashing program as soon as possible.

According to an expedient development of the invention, the message can be fed out via an operator interface that includes acoustic and/or visual output means. Acoustic output means can include, for instance, lamps, light-emitting diodes, and alpha-numeric and/or graphic output means. Visual output means can have, for example, buzzers and/or loudspeakers.

According to a particularly advantageous development of the invention it is possible to provide in particular insulating means counteracting an outward transfer of heat from inside the reservoir. Insulating means of such kind serve to counter a cooling of the washing fluid in the reservoir. The dishwasher's efficiency can be increased thereby, particularly when the period of time between the preheating cycle and washing cycle is a prolonged one.

According to an expedient development of the invention, the reservoir can be embodied such that washing fluid located therein can enter the dishwasher's washing chamber through the force of its weight via a controllable run-out. It is in that way possible to dispense with a device for actively pumping the washing fluid into the washing chamber.

The invention relates furthermore also to a method for operating an inventive dishwasher, in particular a domestic dishwasher, with which method a washing cycle for washing items to be washed in a washing chamber and a preheating cycle for preheating washing fluid for the washing cycle is run, with the preheating cycle including a heating phase during which washing fluid is circulated and heated.

It is provided in the inventive method for the preheating cycle to include a pumping phase that is downstream of the heating phase and during which previously circulated and heated washing fluid is pumped into a reservoir for storing washing fluid.

The inventive method enables a dishwasher, in particular an inventive dishwasher, to be operated efficiently.

Other embodiments and developments of the invention are set out in the subclaims. The advantageous embodiments and developments of the invention that were explained above and/or are set out in the subclaims can therein be applied to the inventive dishwasher and inventive method individually or in any mutual combination.

BRIEF DESCRIPTION OF THE DRAWINGS

The invention as well as its embodiments and developments and the advantages thereof are explained below with the aid of drawings, in which.

DETAILED DESCRIPTION OF EXEMPLARY EMBODIMENTS OF THE PRESENT INVENTION

Figure 1:
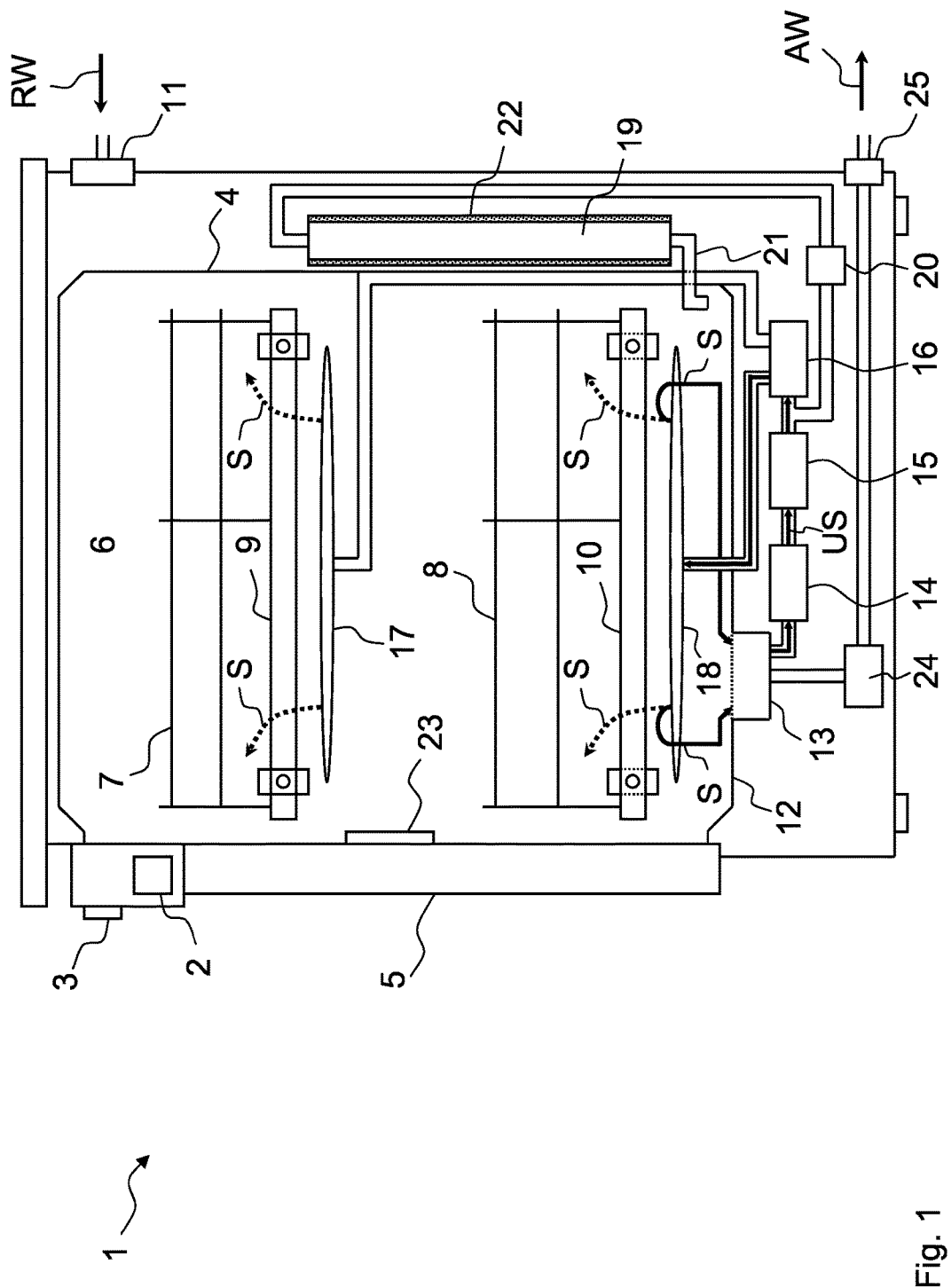
FIG. 1 shows a schematic side view of an advantageous exemplary embodiment of an inventive domestic dishwasher.
Figure 2:
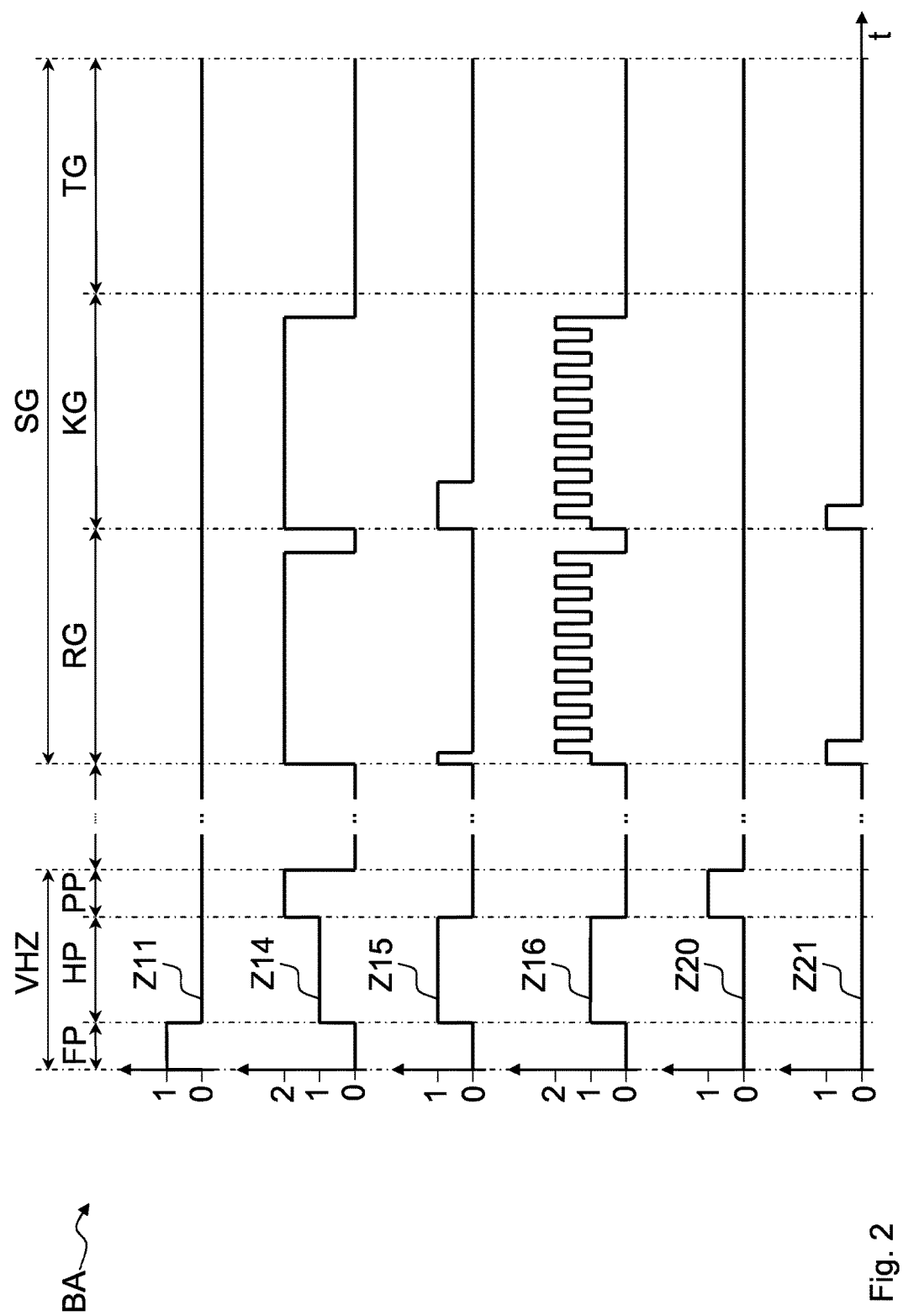
FIG. 2 shows an exemplary operational flow of the dishwasher shown in FIG. 1.

In FIGS. 1 and 2, only a dishwasher's constituent parts necessary for understanding the invention have been assigned reference numerals and explained. The inventive dishwasher can of course include other parts and modules.

FIG. 1 is a schematic side view of an advantageous exemplary embodiment of an inventive domestic dishwasher 1. Dishwasher 1 has a control device 2 in which is stored at least one dishwashing program for controlling a washing cycle for washing items to be washed, in particular crockery, glasses, and/or cutlery. A plurality of washing programs have therein expediently been stored so that by selecting a suitable dishwashing program it will be possible to match the run of a washing cycle controlled by control device 2 to, for example, the amount of items loaded, the type of items loaded, how dirty they are, and/or to the desired length of the washing cycle. The washing program (s) can therein (each) include at least one prewashing step, at least one cleaning step, at least one intermediate washing step, at least one rinsing step, and/or at least one drying step.

Stored further in control device 2 is at least one preheating program for controlling a preheating cycle for preheating washing fluid for a washing cycle. At least a part of the washing fluid required for a washing cycle is heated while the preheating cycle is running and intermediately stored on completion of the preheating cycle until the washing cycle is run. The preheating program can therein be run before the items intended to be washed are loaded into dishwasher 1.

Preheated washing fluid will be available at the start of the washing-cycle run when the items to be washed have then been put into the dishwasher so that one or more heating phases for washing fluid during one or more partial washing cycles of the washing cycle can be shortened or omitted. The washing cycle can overall be brought to a significantly quicker conclusion as a result. In that way, the minimum length of time for which the items to be washed remain in dishwasher 1 and so are unavailable for use can consequently be shortened. That advantage will apply particularly when dishwasher 1 is provided for taking in domestically customary cold water as is usual especially in Europe. However, even when the dishwasher is embodied for taking in warm water, as is predominantly the case in North America and elsewhere, speed advantages can be realized if the temperature of the available warm water is less than the required temperature of a washing fluid used during the washing cycle.

Control device 2 is assigned an operator interface 3 that allows a person operating dishwasher 1 to call up, and thereby start, one of the preheating programs or one of the washing programs mutually independently. That gives said person on the one hand the opportunity to initiate firstly a preheating cycle and later a washing cycle. The washing cycle can therein start basically at any instant after the preheating cycle has concluded. Since, consequently, the preheating and washing cycle are not coupled in time, dishwasher 2 can be employed very flexibly in keeping with the needs of the person operating it. On the other hand, said person has the opportunity of starting a washing cycle without a preceding preheating cycle, which can be expedient if sufficient time is available for running a washing cycle or if an actually intended preheating-cycle run has inadvertently been omitted or a preheating cycle was not wanted. Operator interface 3 is furthermore embodied for feeding out messages serving as an operator prompt. It can for that reason include visual and/or acoustic output means.

Dishwasher 1 furthermore includes a washing container 4 which can be closed by a door 5 so as to produce a closed washing chamber 6 for washing items to be washed. Door 5 is shown in its closed position in FIG. 1. By being swiveled around an axis that is perpendicular to the plane of projection, door 5 can be put into an open position in which it is oriented substantially horizontally and will enable items to be washed to be loaded or, as the case may be, removed. Operator interface 3 is in the exemplary embodiment shown in FIG. 1 located in an easy-to-use manner on an upper section of door 5. Control device 2 is located there, too, so that the necessary signal connections between operator interface 3 and control device 2 can be kept short. It is basically possible, though, to locate operator interface 3 and/or control device 2 elsewhere. Control device 2 could be embodied also in a decentralized manner, by which is meant it includes spatially separated components connected via communication means in such a way that they can interoperate.

Dishwasher 1 has an upper crockery basket 7 and a lower crockery basket 8 for positioning items to be washed. Upper crockery basket 7 is therein arranged on extensible rails 9 each secured to a side wall of washing container 4. Crockery basket 7 can be withdrawn from washing container 4 by means of extensible rails 9 when door 5 is open, which will make it easier to load or, as the case may be, unload upper crockery basket 7. Lower crockery basket 8 is located analogously on extensible rails 10.

Dishwasher 1 further includes a feed device 11 for raw water RW, which device is embodied such that raw water RW fed in from outside can via means that are not shown reach inside washing chamber 6 in a controlled manner and will be available there as washing fluid S for washing items to be washed. Feed device 11 can be controlled by control device 2 and is expediently embodied such that, before entering washing chamber 6, received raw water RW will initially be ducted via a raw-water processing device (not shown) for processing raw water RW and/or via a heat exchanger for prewarming raw water RW.

Embodied on a floor 12 of washing container 4 is a collecting pot 13 in which washing fluid S located in washing chamber 6 collects under the force of gravity. Collecting pot 13 therein has a connection to a circulating pump 14 with the help of which washing fluid S can be pumped out of collecting pot 13 via a heating device 15 to a water divider 16.

Circulating pump 14, heating device 15, and water divider 16 are controlled by control device 2 while dishwasher 1 is operating. Together with connecting lines and one or more spraying devices, they form the main components of the dishwasher's liquid-circulation system.

Circulating pump 14 has preferably a brushless electric motor, preferably a brushless permanent-magnet motor, which can be embodied as a direct-current motor, alternating-current motor, or synchronous motor. A brushless permanent-magnet motor's rotor includes at least one permanent magnet; the stator, by contrast, a plurality of electromagnets. Said electromagnets are commutated via electronic-control means. The permanent-magnet motor's direction of rotation can be clearly established via the electronic-control means so that the water-bearing parts of circulating pump 14 can be optimized in flow terms with respect to a scheduled direction of rotation. The result will be a high pumping capacity accompanied by low energy consumption. The speed of the motor and hence the pumping capacity of circulating pump 14 can moreover be controlled as required by means of the electronic-control means. The brushless permanent-magnet motor can furthermore be embodied as a wet-rotor motor so that no complex sealing measures will be needed.

Heating device 15 is provided for heating washing fluid S and embodied as a continuous-flow heater 15. An openly arranged heating element, for example a heating element located in washing chamber 6 or in collecting pot 13, could alternatively or additionally also be provided.

Water divider 16 enables controlled forwarding of washing fluid S fed in by circulating pump 14. In the exemplary embodiment it has two outputs a first of which is connected to an upper rotatable spraying arm 17 and a second of which is connected to a lower rotatable spraying arm 18. Spraying arms 17 and 18 form a spraying device 17, 18 which is located in washing chamber 6 and enables washing fluid S to be applied to items to be washed. Further outputs could also be provided, though, for example for enabling further spraying arms or static spraying elements to be loaded. Water divider 16 can be controlled such that the washing fluid conveyed by circulating pump 14 will have been conveyed into washing container 2 optionally through neither of spraying arms 17, 18, through one of spraying arms 17, 18, or through both spraying arms 17, 18.

The inventive dishwasher furthermore has a reservoir 19. Reservoir 19 can in the exemplary embodiment shown in FIG. 1 be filled with washing fluid S via a valve 20, with valve 20 having been controlled by control device 2. Reservoir 19 furthermore has a controllable outlet 21 that leads into washing chamber 6. Outlet 21 is embodied on a lower end of reservoir 19 so that washing fluid S located in reservoir 19 can enter washing chamber 6 of dishwasher 1 under the force of gravity when outlet 21 is open. Reservoir 19 is provided over a substantial portion of its surface with thermal insulating means 22 arranged in layered fashion so that a washing fluid S located in reservoir 19 will cool down at most slowly.

Dishwasher 1 can furthermore have a dosing device 23 located, for example, on the inside of door 5. Dosing device 23 is controlled by control device 2 and enables cleaning agents and/or auxiliary cleaning agents such as, for example, rinsing agent to be added to washing fluid S automatically during a washing cycle.

Dishwasher 1 then operates as follows: When the person operating it activates a preprogram for controlling a preheating cycle, a scheduled amount of raw water RW will be introduced into washing chamber 6 by means of feed device 11 in a filling phase that first takes place. The thus introduced raw water RW will there form a washing fluid S. Said washing fluid S collects in collecting pot 13 under the force of gravity. Circulating pump 14 is switched on in a then ensuing heating phase so that washing fluid will be pumped out of collecting pot 13 to heating device 15. Heating device 15 is therein switched on at least at times so that circulated washing fluid S will be heated. Water divider 16 which is connected to the output of heating device 15 is controlled during the heating phase such that the washing fluid being conveyed will have been ducted only to lower spraying arm 18. Washing fluid S exits there through the nozzles embodied on the top side of spraying arm 18 and will return to collecting pot 13 under the force of gravity. So what is formed is a closed circulating flow US, which is symbolized by means of continuous arrows. Circulating pump 14 is operated at only a slow speed during the preheating cycle's heating phase so that washing fluid S exiting from lower spraying arm 18 will have such a slow speed that despite exiting spraying arm 18 upwardly it will not or barely reach lower crockery basket 8 and the items located therein to be washed. Washing fluid S taken from collecting pot 13 will return thereto by the shortest possible route because only lower spraying arm 18 is loaded with washing fluid during the heating phase and because circulating pump 14 is operated only at a slow speed. The effect thereof is that washing fluid S forming circulating flow US will dissipate only a small amount of heat in washing chamber 6.

A pumping phase of the preheating cycle ensues in which washing fluid S is pumped into reservoir 19 when washing fluid S has reached a scheduled temperature, which can be checked by means of a temperature sensor that is not shown. Valve 20 is opened for that purpose and water divider 16 controlled such that its outputs are closed. To speed up the filling of reservoir 19, circulating pump 14 can then be operated at its normal speed, which is to say in particular at a faster speed than in the preheating cycle. Heating device 15 can be deactivated during that time. Valve 20 can be closed again when reservoir 19 has been filled and circulating pump 14 switched off. The pumping phase and preheating cycle overall will thereby have been terminated.

It will then only be possible to open door 5 for putting items to be washed into washing chamber 6 for the first time or additionally. The person operating the dishwasher can call up or, as the case may be, start a dishwashing program for controlling a washing cycle when washing chamber 6 has been loaded as intended. The dishwashing program can then be run using prewarmed washing fluid S located in reservoir 19 so that heating phases during the washing cycle can be of shorter duration compared with conventional dishwashers.

During the washing cycle it is possible during one or more liquid-bearing partial washing cycles for items being washed to be treated with washing fluid S by ducting washing fluid S, initially taken from reservoir 19 via controllable outlet 21, by means of circulating pump 14 via heating device 15 to spraying arms 17 and 18 via water divider 16. Heating device 15 in the liquid-circulating system can therein be used as needed for reheating washing fluid S. Water divider 16 can therein be controlled such that spraying arms 17 and 18 will receive an alternating or simultaneous supply of washing fluid S. Circulating pump 14 is ordinarily operated at its normal speed during the washing cycle so that fluid S exiting spraying arms 17 and 18 will be sprayed from below against the items to be washed. The exiting of washing fluid S during the washing cycle is illustrated in FIG. 1 by means of dotted arrows.

FIG. 2 shows the time sequence of an exemplary operational flow BA of an inventive dishwasher 1, with a preheating cycle VHZ and washing cycle SG being shown. Along a common time axis t, a curve Z11 shows the operating state of feed device 11, a curve Z14 shows the operating state of circulating pump 14, a curve Z15 shows the operating state of heating device 15, a curve Z16 shows the operating state of water divider 16, a curve Z20 shows the operating state of valve 20, and a curve Z21 shows the operating state of controllable outlet 21.

A filling phase FP, the purpose of which is to introduce a scheduled amount of washing fluid S into washing chamber 6 of dishwasher 1, is run at the start of preheating cycle VHZ. Feed device 11 can for that purpose be put into an operating state "1" during which raw water RW flows in. Circulating pump 14 and heating device 15 are switched off during filling phase FP, which is identified in FIG. 2 in each case as operating state "0". Both outputs of water divider 16 are closed as are valve 20 and controllable outlet 21. Said operating states of water divider or, as the case may be, controllable outlet 21 are identified in FIG. 2 by "0". Feed device 11 will be closed when the scheduled amount of raw water RW has been introduced into washing chamber 6, which is shown in FIG. 2 as operating state "0".

Filling phase FP and heating phase HP of preheating cycle are run one after the other in the exemplary embodiment shown in FIG. 2. It would be possible, though, also for filling phase FP and heating phase HP to overlap. A circulating flow US is produced during heating phase HP by means of circulating pump 14 by operating circulating pump 14 at a slow speed. Said speed is in particular slower than during ensuing cleaning cycle RG. That operating state of circulating pump 14 is labeled "1" in FIG. 2. Circulating flow US is therein heated by means of heating device 15. The switched-on state of heating device 15 is identified by "1". Water divider 16 is therein controlled such that only lower spraying arm 18 will be supplied with washing fluid S. That operating state of water divider 16 is shown by "1" in FIG. 2. Heating device 15 is switched off again when washing fluid S has reached the scheduled temperature and heating phase HP will thereby be terminated.

Water divider 16 can be returned to its original "0" state during then ensuing pumping phase PP of the preheating cycle so that both its outputs will be closed. Valve 20 is by contrast opened during pumping phase PP, which is shown by the value "1". Circulating pump 14 is furthermore operated at a faster speed during the pumping phase PP than during heating phase HP, with that operating state of circulating pump 14 being symbolized in FIG. 2 by "2". Circulating pump 14 will be switched off, valve 20 closed, and pumping phase PP and preheating cycle VHZ terminated overall when the scheduled amount of washing fluid S has been pumped into reservoir 19. The output of a message signaling the end of preheating cycle VHZ to the user can be provided after the end of pumping phase PP. The person operating the dishwasher will thereby be put in the position of using the then possible washing cycle as soon as possible. The message can therein be fed out via operator interface 3, which can for that purpose include acoustic and/or visual output means.

Dishwasher 1 will then remain in an idle state until the person operating the dishwasher starts a washing cycle SG by calling up a dishwashing program. Washing cycle SG includes in the example shown in FIG. 2 a cleaning cycle RG, a rinsing cycle KG, and a drying cycle TG in that order. Washing cycle SG could of course also include other partial washing cycles, for example a prewashing cycle or intermediate washing cycle.

Controllable outlet 21 is opened at the start of cleaning cycle RG to allow preheated washing fluid S to enter washing chamber 6. Outlet 21 and the feed line having valve 20 can be realized alternatively also by a single supply line that has a blocking valve and is located preferably underneath the floor of reservoir 19 and connected to the liquid circuit. The blocking valve will then be opened to release the intermediately stored washing fluid, as a result of which said stored fluid will be able to run into the liquid circuit, in particular to circulating pump 14, under the force of gravity. Curve Z21 symbolizes that operating state through briefly assuming the value "1". Circulating pump 14 is also switched on at the start of cleaning cycle RG and operated at a fast speed, in particular a faster speed than during the preheating cycle. Heating device 15 can if necessary also be switched on for a brief period should the temperature of washing fluid S introduced into the liquid circuit be insufficient. Water divider 16 is therein controlled such that lower spraying arm 18 will be loaded with washing fluid S alternating with upper spraying arm 17. Curve Z16 shows that by assuming the value "1" or, as the case may be, "2" in alternating fashion. Circulating pump 14 will have been switched off at an end phase of cleaning cycle RG and washing fluid S of the cleaning cycle will be pumped away via waste-water terminal 25 with the aid of lye pump 24 in a manner not shown.

If dimensioned as sufficiently large and still containing prewarmed washing fluid, controllable outlet 21 can if necessary be opened again at the start of rinsing cycle KG for introducing washing fluid S into washing chamber 6. If not, then water for the rinsing cycle will be fed in via feed device 11 as is otherwise customary. Circulating pump 14 will also be switched on again and operated at a fast speed. Because a higher temperature is ordinarily necessary for the washing fluid during rinsing cycle KG than during a cleaning cycle RG, heating device 15 will ordinarily be switched on again for a certain length of time. Water divider 16 will also be controlled during rinsing cycle KG such that spraying arms 17 and 18 will be supplied with water in alternating fashion. Circulating pump 14 is switched off again at the end of rinsing cycle KG and washing fluid S of rinsing cycle in FIG. 2 will be pumped away in a manner not shown.

Ensuing drying of the washed items in drying cycle TG takes place by means of, for example, what is termed self-drying whereby the residual water adhering to the washed items evaporates and condenses on, for instance, washing container 4, or by means of a drying device that is not described within the scope of this application.

The duration of washing cycle SG will overall be shortened because prewarmed washing fluid S will owing to the previously performed preheating cycle be available for both cleaning cycle RG and, where applicable, rinsing cycle KG. The heating times during both cleaning cycle RG and, where applicable, rinsing cycle KG can be kept short thereby.

It will be possible to shorten an inventively embodied dishwasher's running time in that way through warming washing fluid before a dishwashing program starts. A device having a BLDC pump, a fluid store, and a water divider is used in an advantageous exemplary embodiment of the present invention. The water is therein initially put into the washing container. The water divider will then in particular be controlled such as to release only the lower spraying arm. The pump will then be switched on and operated at such a slow speed that the water coming out of the spraying arm will not suffice for the crockery possibly located in the device to be sprayed. The heater will be activated thereafter and the water will continue being circulated. The fluid store's closing valve will be opened when the desired temperature has been reached, all feed lines to the spray levels will be closed, the motor's speed will be increased, and the water located in the device will be pumped into the fluid store. The valve in the feed line to the fluid store will thereafter be closed again. The described preheating function can in particular be selected via option keys. A simple and economical solution for preheating a dishwasher without an additional heating element can be provided thanks to this advantageous embodiment variant.

In particular the fluid store or, as the case may be, reservoir can be filled with the used rinsing fluid at the end of the respectively running dishwashing program's rinsing cycle. That stored washing fluid can be released from the reservoir or can run therefrom into the dishwasher's liquid circuit if a preheating cycle is later required and can then be heated in a manner analogous to the embodiment variants described above in connection with the preheating cycle and pumped back into the reservoir. It will in that case not be necessary to supply raw water from the feed device.

LIST OF REFERENCES

1 Dishwasher
2 Control device
3 Operator interface
4 Washing container
5 Door
6 Washing chamber
7 Upper crockery basket
8 Lower crockery basket
9 Extensible rail
10 Extensible rail
11 Feed device for raw water
12 Floor of the washing container
13 Collecting pot
14 Circulating pump
15 Heating device
16 Water divider
17 Upper spraying arm
18 Lower spraying arm
19 Reservoir
20 Valve
21 Controllable outlet
22 Insulating means
23 Dosing device
24 Lye pump
25 Waste-water terminal
RW Raw water
S Washing fluid
US Circulating flow
AW Waste water
BA Operational flow
VHZ Preheating cycle
FP Filling phase
HP Heating phase
PP Pumping phase
SG Washing cycle
RG Cleaning cycle
KG Rinsing cycle
TG Drying cycle
Z11 Operating state of the feed device
Z14 Operating state of the circulating pump
Z15 Operating state of the heating device
Z16 Operating state of the water divider
Z20 Operating state of the valve
Z21 Operating state of the controllable outlet

The invention claimed is:

1. A dishwasher, comprising:
a washing chamber to contain washing fluid;
a reservoir, the reservoir being thermally insulated and separate from the washing chamber, for storing washing fluid;
a control device configured to call up (1) at least one dishwashing program, the dishwashing program being configured to control a washing cycle for washing items to be washed in a washing chamber, and (2) at least one preheating program for controlling a preheating cycle for preheating washing fluid for a washing cycle, the control device being configured to allow the at least one dishwashing program and the at least one preheating program to be called up separately from each other; and
a circulating pump having an input side connected the washing chamber, wherein:
the preheating cycle comprises a heating phase during which washing fluid is circulated by said circulating pump and the circulated washing fluid is heated; said preheating cycle includes a pumping phase downstream of the heating phase, the pumping phase comprising previously circulated and heated washing fluid being pumped from the washing chamber into the reservoir;

the circulating pump is in fluid communication with the reservoir for pumping washing fluid into the reservoir via a valve during the pumping phase of the preheating cycle, the control device is further configured to operate the circulating pump at a speed which is increased during the pumping phase of the preheating cycle compared with the heating phase in order to speed up filling of the reservoir, the control device is further configured to close the valve on condition that the reservoir is filled; and the control device is further configured to direct the washing fluid to circulate via at least one spraying element located in a lower region of the washing chamber during the preheating cycle, the spraying element being arranged and configured to direct washing fluid towards items to be washed during the wash cycle.

2. The dishwasher of claim 1, constructed in the form of a domestic dishwasher.

3. The dishwasher of claim 1, further comprising a heating device embodied as a continuous-flow heater for heating washing fluid during the heating phase of the preheating cycle.

4. The dishwasher of claim 1, further comprising the at least one spraying device located in the washing chamber for feeding back washing fluid into the collecting pot of the washing chamber during the heating phase of the preheating cycle, said at least one spraying device being connectable to an output side of the circulating pump and provided for spraying items to be washed with washing fluid during a washing cycle.

5. The dishwasher of claim 4, wherein the at least one spraying device has a plurality of spraying elements which are individually connectable to the circulating pump via a water divider, said water divider being controlled such that washing fluid is fed back into the collecting pot of the washing chamber during the heating phase of the preheating cycle substantially via one of the spraying elements, said one spraying element being located in a lower region of the washing chamber.

6. The dishwasher of claim 1, further comprising a spraying device having the at least one spraying element located in a lower region of the washing chamber for substantially feeding back washing fluid into the collecting pot of the washing chamber during the heating phase of the preheating cycle.

7. The dishwasher of claim 1, wherein the circulating pump operates at a speed which is controlled to be slower during the heating phase of the preheating cycle than a nominal speed of the circulating pump.

8. The dishwasher of claim 1, further comprising the at least one spraying device having a spraying element located underneath a crockery basket, wherein the circulating pump operates at a speed which is controlled such that washing fluid exiting the spraying element during the heating phase of the preheating cycle is substantially prevented from reaching the crockery basket or any items in the crockery basket.

9. The dishwasher of claim 1, wherein the circulating pump includes a brushless electric motor.

10. The dishwasher of claim 9, wherein the brushless electric motor is a brushless direct-current motor.

11. The dishwasher of claim 1, further comprising an operator interface constructed to output a message signaling an end of the preheating cycle to a user after the pumping phase of the preheating cycle is terminated.

12. The dishwasher of claim 11, wherein the operator interface includes an acoustic and/or visual output.

13. The dishwasher of claim 1, wherein the reservoir has a controllable outlet through which washing fluid in the reservoir is able to enter the washing chamber by the force of its weight.

14. The dishwasher of claim 1, wherein the washing chamber includes a floor associated with a collecting pot, and the washing fluid is pumped from the collecting pot to the reservoir during the pumping phase.

15. The dishwasher of claim 1, wherein the spraying element is a spraying arm.

16. A method for operating a dishwasher, comprising:

activating a preheating cycle for preheating a washing fluid prior to a washing cycle;

circulating the washing fluid through at least a first lower spraying element within a lower portion of a washing chamber, the first lower spraying element being configured and arranged to direct the washing fluid towards items to be washed during the washing cycle, and heating the washing fluid during circulation of the washing fluid during a heating phase of the preheating cycle;

pumping the previously circulated and heated washing fluid from the washing chamber into a separate thermally insulated reservoir configured to store washing fluid during a pumping phase of the preheating cycle after the heating phase; and running a washing cycle for washing items to be washed in a washing chamber after the preheating cycle, wherein a circulating pump is in fluid communication with the separate reservoir for pumping washing fluid into the separate reservoir via a valve during the pumping phase of the preheating cycle, wherein the circulating pump operates at a speed which is increased during the pumping phase of the preheating cycle compared with the heating phase in order to speed up filling of the separate reservoir, and wherein the valve is closed on condition that the separate reservoir is filled.

17. The method for operating a dishwasher of claim 16, wherein the washing chamber includes a collection pot located along a floor of the washing chamber, and the pumping includes pumping the washing fluid from the collection pot to the separate reservoir.

18. The method for operating a dishwasher of claim 16, wherein washing fluid flows from the separate reservoir to the washing chamber by gravity, wherein the washing cycle commences.

* * * * *